Nov. 24, 1953  H. G. BECK  2,660,275
GASKET
Filed Jan. 14, 1950

INVENTOR
Howard G. Beck
BY Evans + McCoy
ATTORNEYS

Patented Nov. 24, 1953

2,660,275

UNITED STATES PATENT OFFICE 2,660,275

GASKET

Howard G. Beck, Wabash, Ind., assignor to The General Tire and Rubber Company, Akron, Ohio, a corporation of Ohio Application January 14, 1950, Serial No. 138,672

7 Claims. (Cl. 189—78)

This invention relates to improvements in mountings for sealing and glazing two panels together and relates in particular to a combinational metal trim strip and spreader strip for use with mountings for windows and windshields on motor vehicles.

Automobile windows and windshields are often held in place by a linear rubber mounting having oppositely disposed grooves into which fit the automobile body on one side and the window glass on the other side with a longitudinal opening intermediate the grooves into which is pressed a spreader element to force the material holding the window glass and automobile body into tight gripping engagement therewith. Should a trim strip be desired, it must be hung onto this mounting from an additional slot or slots in the mounting after the mounting has been assembled as described. This is an additional step which contributes to higher production costs and is therefore undesirable.

One object of the present invention is to provide a facile method of attaching metal trim strips onto linear rubber mountings.

Another object is to develop a combination trim strip and spreader element and thereby eliminate extra parts and additional operations in assembly.

Other objects will be apparent from the following description of the invention as illustrated by the accompanying drawings in which like parts are denoted by like numerals of reference throughout.

Figure 1:
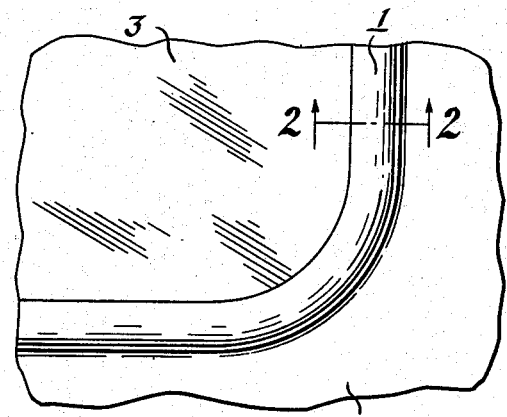
Figure 1 is an elevational view of a portion of an automobile window, joined by a linear rubber mounting and covered by a trim strip of this invention.
Figure 2:
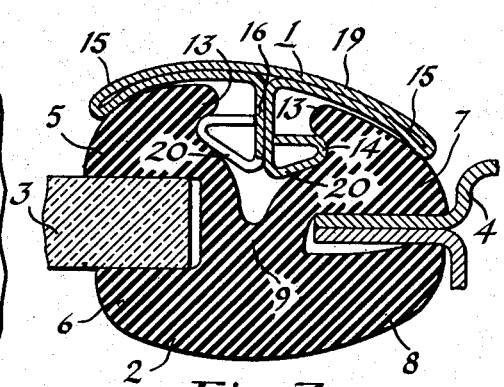
Fig. 2 is an enlarged cross-sectional view taken along line 2—2 of Fig. 1 showing the mounting and the shape and action of one modification of the trim strip of this invention.
Figure 3:
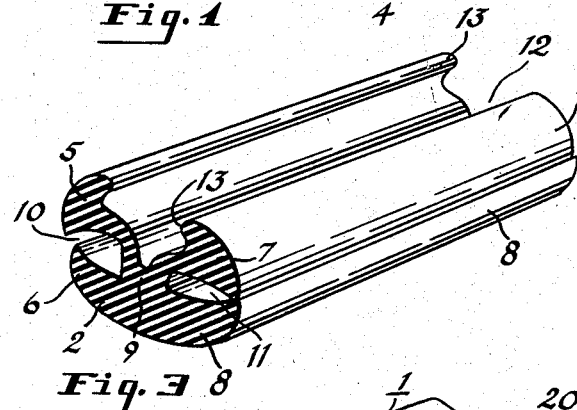
Fig. 3 is a perspective of the linear mounting as it is shaped prior to assembly.

Now with particular reference to the drawings, the trim strip 1 of this invention is shown in Figs. 1 and 2 assembled in the linear mounting 2 with the automobile window glass 3 and automobile body 4. As visible in Fig. 2, the window glass or left-hand panel 3 and the automobile body or right-hand panel 4 are firmly held in place by the sealing flanges 5, 6, 7 and 8 of the mounting which are respectively connected by a central connecting portion 9 into the general shape of a horizontal H section. In the unassembled form of Fig. 3, the flanges 5 and 6 form with the connecting portion 9 the left-hand panel receiving groove or channel 10 and the flanges 7 and 8 form with the connecting portion 9 the right-hand panel receiving groove or channel 11. Prior to fitting or locking the mounting in place, the window glass 3 is fitted into groove 10 and the automobile body 4 is fitted into groove 11. The flanges 5, 6, 7 and 8 have concave or convergent inner faces so that the grooves 9 and 10 formed by pairs of these faces are generally convergent when the flanges grip the panels 3 and 4. The outer edges of the flanges consequently exert a greater gripping force than the inner edges and provide a firm and watertight seal.

The flange portions 6 and 8 on one side of the median plane through the grooves 10 and 11 are movable toward each other with difficulty because for any motion the rubberlike material therebetween must be compressed. These flanges consequently tend to resist any movement relative to each other. Flanges 5 and 7 on the other side of the median plane are relatively freely movable toward each other because of the longitudinal opening or cavity 12. The flanges 5 and 7 move toward each other easily because there is no mass of rubberlike material between them to resist this movement. This allows the grooves 10 and 11 to open and receive the panel edges when the mounting is in the unlocked position of Fig. 3. On the other hand, when the mounting or seal is in the locked position of Fig. 2 pressure of the flanges 5 and 7 against the panel surfaces applies tension to the connecting portion 8 which causes the flanges 6 and 8 to bear strongly against the opposite side of the panels 3 and 4.

In accordance with the present invention, the spreader portion, (generally wedge-shaped) of a combination trim strip and spreader 1 that is coextensive in length with the body of the seal or mounting 2 is pressed into the longitudinal opening 12 to force the flanges 5 and 7 down upon the panels 3 and 4 and hold them firmly but resiliently in position. This trim strip is formed of sheet metal and bent convexly to cover and trim the outer surface of the mounting. Along the central inner portion of the strip is formed a longitudinal post or rib 16 from which extend tongues or lugs 14 to form a spreader element.

The longitudinal opening 12 and the spreader element of the trim strip 1 are shaped and proportioned relative to each other to interfit. The longitudinal opening has overhanging lips 13 under which the laterally projecting tongues or lugs 14 of the trim strip fit. At the same time the tongues 14 on the trim strip 1 are sufficiently wide to spread and preferably fill the longitudinal opening 12 to bring the flanges 5, 6, 7 and 8 of the mounting into tight gripping engagement with the panels 3 and 4. After the trim strip is placed in the longitudinal opening, the wide decorative base or outer portion 19 of the strip covers the outer portion of the mounting and provides the cover and trim desired.

Figure 5:
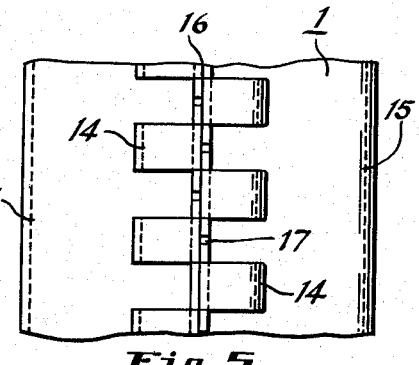
Fig. 5 is a top plan view of the modification of the trim strip shown in Fig. 4. This shows the tongues of the separate flanges backed together and alternately spaced.
Figure 4:
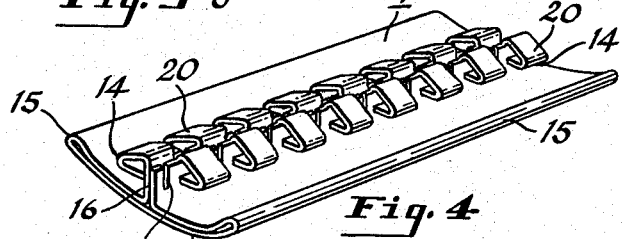
Fig. 4 is a perspective of one modification of the trim strip of this invention. This modification has a series of tongues formed from one flange of the strip backed against a separate series of tongues formed from the other flange of the strip to form the spreader element.

The trim strip is made in two modifications. The modification of Figs. 2, 4 and 5 or trim strip 1 is made of a single sheet of metal so folded that the flanges or arms 15 which together form the outer portion 19 are of double thickness and concave on the inner surface. Along the central portion of the strip the metal sheet is folded at general right angles to the flanges 15 to form a post or rib 16. Extending laterally from the upper portion of this post or rib is a series of tongues or lugs 14, all those formed from the sheet of the right-hand flange extending to the right and all those formed from the sheet of the left-hand flange extending to the left. The lugs or tongues 14 are preferably of generally triangular shape or have a sloping face 20 which forms an acute angle with the main portion of the rib 16 so that the spreader portion of the trim strip is generally wedge-shaped with the wider portion closer to the trim portion of the strip. The lugs or tongues 14 on both sides of the rib 16 are preferably separated from each other or alternate in order to provide the necessary lateral and vertical flexibility to the trim strip. This flexibility is required for bending around corners and for bending the strip when pressing it into the longitudinal opening of the mounting. If desired, slits 17 (preferably generally vertical) may be made in the rib 16 to provide still greater flexibility of the strip. The plan arrangement of this strip is shown in Fig. 5.

Figure 7:
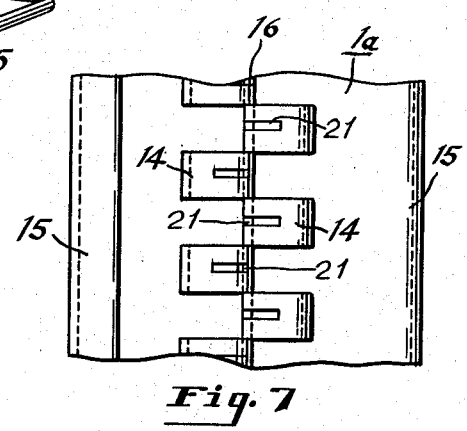
Fig. 7 is a top plan view of the other modification showing how the tongues are formed from one flange and project alternately on the different sides thereof.
Figure 6:
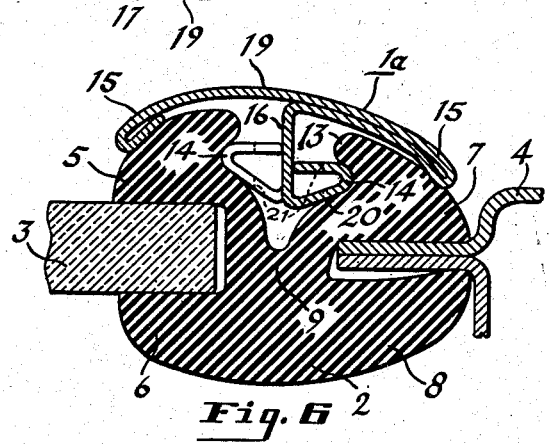
Fig. 6 is a cross-sectional view of the mounting with the other modification of the trim strip placed therein in which the tongues of the trim strip are formed from one flange and are bent on alternate sides to form the spreader element.

The other modification of the trim strip is illustrated in Figs. 6 and 7. Here the strip 1a has a post or central rib 16 formed by the extension of the sheet of only one flange or arm 15. In this case it is formed by extension of the right-hand flange 15 bent at right angles to the plane of the trim strip front. The lugs or tongues 14 on the rib 16 are bent alternately to the right and left to form a blunt wedge-shaped spreader element in cross-section as shown. These lugs spread and fill the longitudinal opening and force the flanges of the mounting into tight gripping engagement with the panels 3 and 4 in the grooves. The lugs also fit under the overhanging lips 13 at the top of the opening to hold the trim strip in place once it has been located. The central rib 16 is provided with slots 21 as shown in Figs. 6 and 7 to assist in providing flexibility in the plane of the trim portion 19 of the strip. The slots should extend substantially down the central rib similar to the slots 17 of Fig. 4 and around one third to one half way out on the lugs 14.

The assembly process is relatively simple. Prior to assembly, the trim strip must be shaped on special machines to conform to the outline of the particular window into which it is to fit. Then the rubber mounting is located on the body frame and window and finally the trim strip is pressed into the opening. The outer surface of the trim strip can be chromium or cadmium plated or painted to the color desired. It can be replaced easily when discolored or stained by a new trim strip. If desired, the old strip may be removed and replated to renew its appeal.

Although this invention may be employed in various ways, only preferred embodiments have been illustrated and described. Other embodiments may be made within the invention as provided by the patent statutes.

What I claim is:

1. A flexible linear mounting of rubberlike material for joining adjacent panel edges comprising a body of substantially uniform cross-section with two spaced and generally opposite grooves therein, a longitudinal opening in said body between said grooves with an overhanging lip along both edges, and a combination metal trim strip and spreader formed from sheet metal with a trim portion covering the outer surface of the mounting and a spreader portion integrally attached thereto with a central rib and laterally extending, alternately spaced tongues, said opening and spreader portion being so proportioned that after the panel edges have been fitted into the spaced grooves said spreader fits tightly into said opening with said spreader tongues inside the overhanging lips of the mounting and compresses the body of the rubberlike material against the portions of the panels in said grooves to hold them firmly and said spreader is held in position by the body of the mounting pressing against it.

2. A flexible linear mounting of rubberlike material for joining adjacent panel edges comprising a body of substantially uniform cross-section with two spaced and generally opposite grooves therein, a longitudinal opening in said body between said grooves with an overhanging lip along both edges, and a trim strip formed of sheet metal with a trim portion covering the outer surface of the mounting and a central post attached thereto formed by two bent abutting thicknesses of sheet metal with alternately spaced tongues extending laterally therefrom, all tongues from one formation of sheet metal extending laterally in one direction and all tongues from the other formation of sheet metal extending laterally in the opposite direction, said opening and the tongues of said trim strip being so proportioned that after the panel edges have been fitted into the spaced grooves said tongues fit tightly into said opening inside the over-hanging lips of the mounting and compress the body of the rubberlike material against the portions of the panels in said grooves to hold them firmly.

3. A flexible linear mounting of rubberlike material for joining adjacent panel edges comprising a body of substantially uniform cross-section with two spaced and generally opposite grooves therein, a longitudinal opening in said body between said grooves with an overhanging lip along both edges, and a trim strip formed of sheet metal with a trim portion covering the outer surface of the mounting and a central rib attached thereto formed by a bend of one thickness of sheet metal from the trim portion and having alternately spaced lugs extending laterally on both sides therefrom, said opening and the lugs of said trim strip being so proportioned that after the panel edges have been fitted into the spaced grooves said lugs fit tightly into said opening inside the overhanging lips of the mounting and compress the body of the rubberlike material against the portions of the panels in said grooves to hold them firmly.

4. The combination of claim 2 in which the post portion of the trim strip is slotted vertically to provide greater flexibility.

5. The combination of claim 3 in which the rib portion of the trim strip is slotted vertically to provide greater flexibility.

6. A combination metal trim strip and spreader for insertion in the opening in linear mountings of rubberlike material intermediate the panel edge receiving grooves thereof, comprising a linear, convex-in-cross-section, trim portion covering the outer surface of one side of the mounting and a central rib with laterally extending, alternately spaced tongues being so proportioned that said tongues fit in said opening with a spreading and wedging action, said strip being relatively flexible in the plane perpendicular to the plane of the central rib.

7. A trim strip according to claim 6 in which the trim strip is formed from a single piece of metal and in which the central rib is provided with a multiplicity of slots perpendicular to the trim portion.

HOWARD G. BECK.

References Cited in the file of this patent

UNITED STATES PATENTS

| Number | Name | Date |
|---|---|---|
| 1,312,056 | Shaw | Aug. 5, 1919 |
| 1,961,352 | Hall | June 5, 1934 |
| 2,350,430 | Ulrich | June 6, 1944 |
| 2,492,566 | Geyer | Dec. 27, 1949 |
| 2,584,813 | Poupitch | Feb. 5, 1952 |